INVENTORS
DAVE MAKO
ROBERT H. GEORGE.

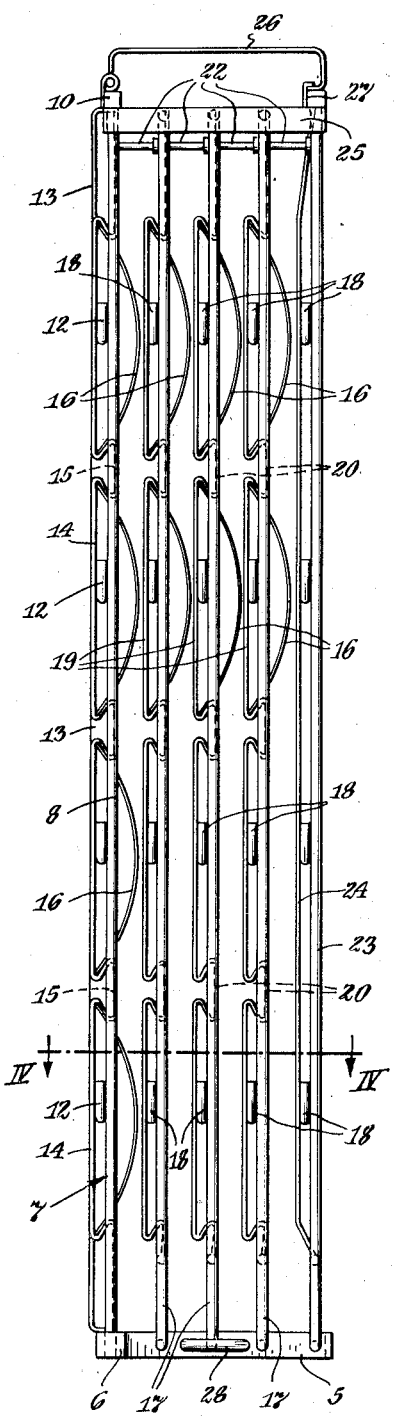
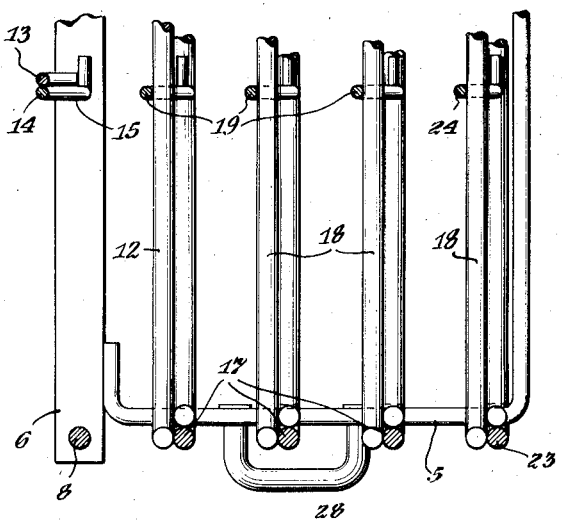
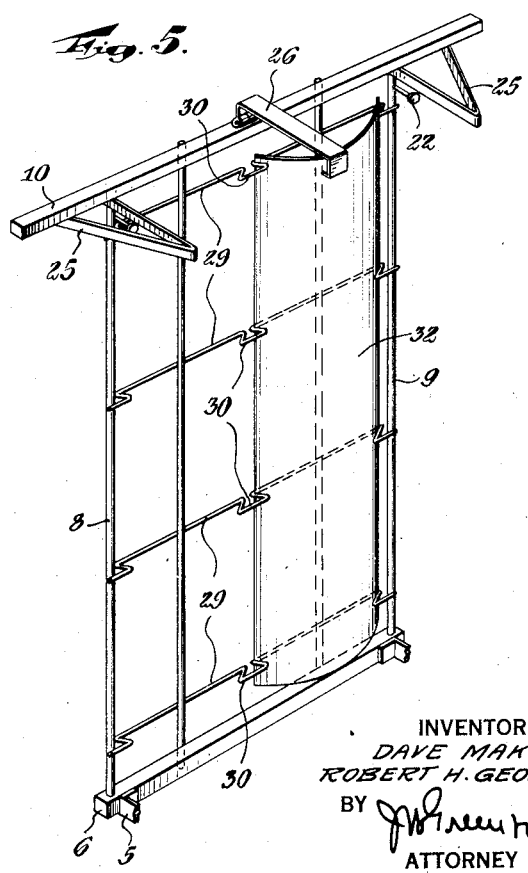

Patented June 17, 1947

2,422,307

UNITED STATES PATENT OFFICE 2,422,307

MULTIPLE PROCESSING FRAME

Dave Mako, Catonsville, and Robert H. George, Baltimore, Md., assignors to Westinghouse Electric Corporation, East Pittsburgh, Pa., a corporation of Pennsylvania Application February 25, 1944, Serial No. 523,844

3 Claims. (Cl. 95—100)

The present invention relates to a holder for a plurality of photographic films, especially of the type for the taking of stereoscopic X-ray exposures and the like, to facilitate handling of such films during developing, washing and drying thereof.

Many similar devices of this general type are known to the art but the disadvantage inherent therein has been that the films are so supported that their marginal surfaces contact portions of the holder, resulting in the film being marred or incompletely developed, so that some of the film surface is lost through disfigurement of the image, or the indicia usually employed to identify the film and positioned to appear on the margin of the film is not recorded upon complete development.

It is accordingly an object of the present invention to provide a film holder for supporting a plurality of photographic films in which no portion of the exposed surface of the film contacts the holder thereby eliminating possible defacement of the film.

Another object of the present invention is the provision of a film holder for supporting a plurality of films in which the holder is readily separable for the insertion and removal of films without mutilation and when in a closed position can be readily handled and immersed in the customary developing and washing solutions.

Figure 1:
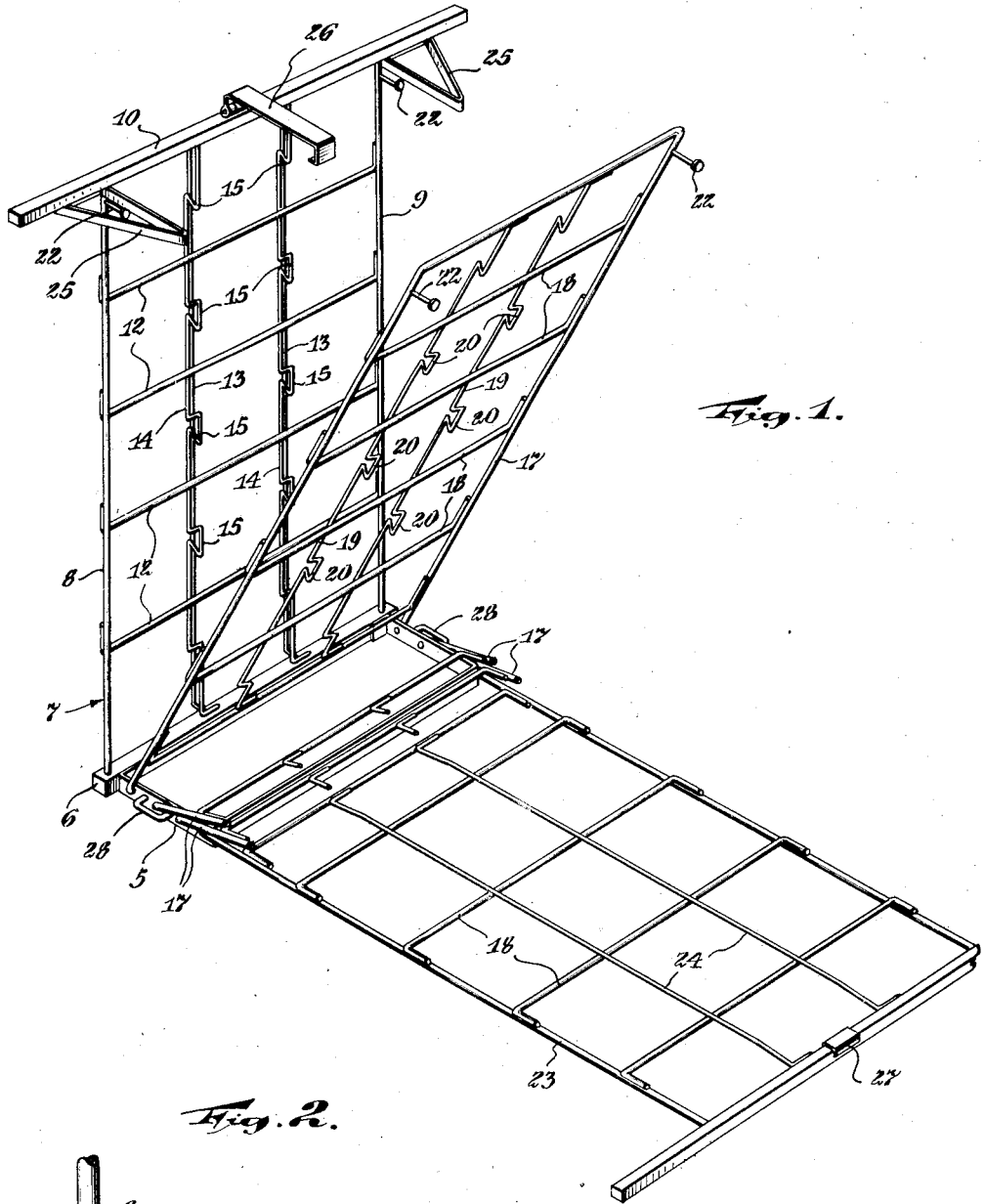
Figure 2:
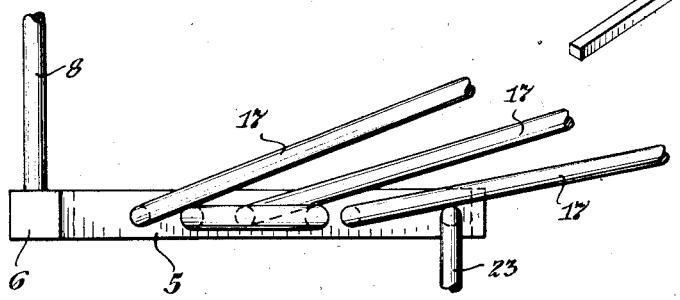

Still further objects of the present invention will become obvious to those skilled in the art by reference to the accompanying drawings wherein:

Fig. 1 is a perspective view of a film holder constructed in accordance with the present invention with certain portions thereof broken away to better illustrate the structure, Fig. 2 is a fragmentary view on an enlarged scale of the film holder as shown in Fig. 1, Fig. 3 is an elevational side view showing the film holder of Fig. 1 in the loaded and closed position, Fig. 4 is a sectional view taken on the line IV—IV of Fig. 3, and Fig. 5 is a fragmentary perspective view of a modification which the film holder of the present invention may take.

Referring now to the drawings in detail, the film holder as shown in Fig. 1 comprises a rectangular base member 5 having a re-enforcing bar 6 secured to one of the long sides thereof and rigidly supporting upright frame 7. As shown, this rigid frame 7 comprises a pair of side rods 8 and 9 secured to the re-enforcing bar 6 by riveting, welding or the like, and similarly secured to a top bar 10. Extending horizontally between the vertical side rods 8 and 9 are a plurality of tie-rods 12 bent angularly at their ends and welded, or otherwise affixed, to the side rods. In addition, a plurality of vertical tie-rods 13 are secured as by welding to the top bar 10 and base bar 6 as well as to the horizontal tie-rods 12 at their points of intersection, all such tie-rods serving to increase the rigidity of the frame 7.

Also vertically disposed of the frame 7 and secured to the top bar 10 and base bar 6 are a plurality of support rods 14 bent upon themselves at spaced distances to form supports 15 for films 16 (Fig. 2). As will be noted from Fig. 3, the spacing between the supports 15 are slightly less than the width of the films 16, so that the latter are slightly bowed when placed between the supports which gives sufficient tension to retain the films in proper position. Moreover, since the films thus rest in the frame 7 with only their edges engaging the supports 15, the surface of the films is free of any contact whatsoever, thus eliminating the possibility of defacement and enabling the developing and washing solutions to cover the entire surface of the films.

The base member 5 also supports a plurality of pivoted frames 17 all of which are alike, except the last one in the series, and substantially identical to the rigid back frame 7. However, the side rods and top of these latter frames 17 are shown formed of one piece bent into U-shape with the extremities extending angularly through the base 5 thus forming a pivoted or hinged connection with the latter. These frames are likewise provided with horizontal tie-rods 18 in the same manner as the back frame 7. However, vertical support rods 19 provided with their supports 20, similar to the tie-rods 14, only need be employed in these latter frames 17. Each of these hinged frames 17, as well as the back frame 7, are provided with projecting spacer pins 22 engageable with the next adjacent frame in the series to maintain the frames in spaced relation with each other when in the closed position as shown in Fig. 3. It is also to be noted that although each frame is arranged to support four films and only four supporting frames are shown as employed, thus making the holder of sixteen film capacity, by making each frame higher and increasing the number of frames, the total number of films which can be supported will be multiplied accordingly.

The last frame in the series or the front frame 23 is similar to the back frame 7, except that it is provided with no vertical support rods but merely vertical tie-rods 24 and is pivotally connected with the base 5 in the same manner as the intermediate frames 17. To load the holder with film the various frames are angularly disposed, as shown in Figs. 1 and 2, with the exception of the vertically rigid back frame 7 which is first loaded by bowing the films 16 and allowing them to spring into contact with the spaced projecting supports 15. After this back frame 7 is loaded, the next adjacent hinged frame 17 is then moved to the vertical position and loaded in the same manner with the films 16. When swung into the vertical position the frame 17 is held in such position by a pair of yieldable clips 25 projecting from the top bar 10 of the back frame 7. Each such frame 17 is thus successively loaded and when completed, the front frame 23 is then swung into the vertical position.

For the purpose of retaining the front frame 23 and thus all the frames 17 in a vertical position, a hinged clamp 26 is pivoted to the top bar 10 of the back frame 7 and extends across all the frames into engagement with a U-shaped clip 27 secured to the top bar of the front frame 23, the clamp 26 being sufficiently yieldable to enable the angular end thereof to snap under the clip 27 as shown in Fig. 3. It will be noted that the top bar of both the back frame 7 and front frame 23 extends beyond the width of these frames which thus enables engagement of the holder with the walls of the developing and washing tanks so that the holder together with its supported films 16 can be immersed therein. The base 5 is provided with a pair of brackets 28 which may serve as handles for transporting the film holder but primarily serves as a rest to maintain the frames out of contact with each other even in their angular position, as can be more readily appreciated from Fig. 2.

The modification as shown in Fig. 5 is in most respects identical to that previously described. It differs therefrom only in the disposition of the support rods 29 with their projecting supports 30 which, in this modification, are horizontal, instead of vertical, as in the preceding modification, so that the films 32 may be held in a vertical position as shown in Fig. 5 in lieu of the films being horizontal.

It thus becomes obvious to those skilled in the art that a film holder is herein shown and described which is of very simple construction and thus economical to manufacture. Moreover, the plurality of films are supported at points on their edges so that the surface of the film exposed to the image is prevented from being defaced in any way by contacting portions of the holder. Also, by supporting the films in this manner their entire surface is accessible to the developing and washing solutions so that when completely developed there is no marring of the margin of the films.

Although two modifications of the present invention have been shown and described, it is to be understood that still further embodiments thereof may be made without departing from the spirit and scope of the appended claims.

We claim:

1. A film holder for supporting a plurality of films comprising a base member, a series of frame members carried by said base in superimposed spaced relation to each other, and a plurality of rods carried by said frame members, some of said rods being bent upon themselves and then forward and uniting with a correspondingly bent portion of the adjacent section and aligning with similarly kinked portions of other of said rods to form rows of duplicate spaced kinked projections across the surface of said frames and having a spacing between rows slightly less than the film width for retaining films therebetween by engaging the edges thereof upon a slight bowing of said films.

2. A film holder for supporting a plurality of films comprising a base member, a series of frame members pivotally connected to said base and movable into an angular separated position for film loading and into spaced superimposed position when loaded, and a plurality of rods carried by said frame members, some of said rods being bent to form laterally spaced parallel sections joined to the main section at an angle of less than 90° to provide rows of kinked duplicate spaced projections extending laterally and longitudinally across the surface of said frames and having a spacing between rows slightly less than the film width for retaining films therebetween by engaging the edges thereof upon a slight bowing of said films.

3. A film holder for supporting a plurality of films comprising a base member, a series of frame members pivotally connected to said base and movable into an angular separated position for film loading and into spaced superimposed position when loaded, a plurality of rods carried by said frame members, some of said rods being bent to form laterally spaced parallel sections joined to the main section at an angle of less than 90° to provide rows of kinked duplicate spaced projections extending laterally and longitudinally across the surface of said frames and having a spacing between rows slightly less than the film width for retaining films therebetween by engaging the edges thereof upon a slight bowing of said films, and a fastener pivotally connected to one frame and engageable with the last frame of the series to maintain all of said frames in substantially parallel superimposed relation upon complete loading of said film holder.

DAVE MAKO.
ROBERT H. GEORGE.

REFERENCES CITED

The following references are of record in the file of this patent:

UNITED STATES PATENTS

| Number | Name | Date |
| --- | --- | --- |
| 1,234,641 | Dickson | July 24, 1917 |
| 2,181,206 | Rinn | Nov. 28, 1939 |
| 681,653 | Potter | Aug. 27, 1901 |
| 2,112,028 | Kirby | Mar. 22, 1938 |
| 1,057,800 | Brehmer et al. | Apr. 1, 1913 |

FOREIGN PATENTS

| Number | Country | Date |
| --- | --- | --- |
| 6,841 | Great Britain | Mar. 20, 1912 |
| 4,165 | Great Britain | Feb. 19, 1910 |
| 12,804 | Great Britain | May 31, 1912 |